(12) United States Patent
Fujita

(10) Patent No.: US 7,138,168 B2
(45) Date of Patent: Nov. 21, 2006

(54) HONEYCOMB STRUCTURE BODY AND METHOD FOR MANUFACTURING THE SAME

(75) Inventor: Jun Fujita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 176 days.

(21) Appl. No.: 10/496,837

(22) PCT Filed: Dec. 4, 2002

(86) PCT No.: PCT/JP02/12696

§ 371 (c)(1),
(2), (4) Date: May 27, 2004

(87) PCT Pub. No.: WO03/048072

PCT Pub. Date: Dec. 6, 2003

(65) Prior Publication Data

US 2005/0079975 A1    Apr. 14, 2005

(30) Foreign Application Priority Data

Dec. 6, 2001    (JP) ............................. 2001-372907

(51) Int. Cl.
*B32B 3/12* (2006.01)
*B28B 1/00* (2006.01)

(52) U.S. Cl. ...................... 428/116; 428/34.4; 428/118; 428/192; 428/73; 427/284; 427/287; 427/244; 156/89.22; 264/631; 264/340

(58) Field of Classification Search ................ 428/116, 428/34.4, 118, 192, 73; 427/284, 287, 244; 156/89.22; 264/631, 340
See application file for complete search history.

(56) References Cited

U.S. PATENT DOCUMENTS 4,335,783 A    6/1982    McBrayer et al.
4,595,662 A    6/1986    Mochida et al.
5,914,187 A *  6/1999    Naruse et al. .............. 428/327

FOREIGN PATENT DOCUMENTS

| EP | 1 435 348 A1 | 7/2004 |
|----|--------------|--------|
| EP | 1 447 535 A1 | 8/2004 |
| EP | 1 468 801 A1 | 10/2004 |
| JP | A 61-26572   | 2/1986 |
| JP | B2 61-51240  | 11/1986 |

(Continued)

OTHER PUBLICATIONS

SAE article 860008; 1986; pp. 11-18.

*Primary Examiner*—Ling Xu
(74) *Attorney, Agent, or Firm*—Oliff & Berridge, PLC

(57) ABSTRACT

There is provided a honeycomb structure 1 produced by bonding a plurality of honeycomb segments 12 into one piece via a bonding layer 8, each segment 12 having a number of through-holes 3 divided from each other by porous partition walls 2 and extending in the axial direction of the honeycomb segment. The bonding layer 8 comprises at least one cement layer 10 and at least one undercoat layer 9 present between the honeycomb segment 12 and the cement layer 10. There is provided a process for producing a honeycomb structure 1, wherein bonding the honeycomb segments 12 comprises applying at least one layer of an undercoat on each honeycomb segment 12, applying at least one layer of a cement, and bonding the honeycomb segments into one piece. The honeycomb structure has a high bonding strength and hardly gives defects such as cracks in bonded portion.

10 Claims, 3 Drawing Sheets
(1 of 3 Drawing Sheet(s) Filed in Color)

FOREIGN PATENT DOCUMENTS

| | | |
|---|---|---|
| JP | A 4-319435 | 11/1992 |
| JP | A 8-28246 | 1/1996 |
| JP | A 2000-7455 | 1/2000 |
| JP | A 2000-279729 | 10/2000 |
| JP | A 2001-96116 | 4/2001 |

* cited by examiner

HONEYCOMB STRUCTURE BODY AND METHOD FOR MANUFACTURING THE SAME

TECHNICAL FIELD

The present invention relates to a honeycomb structure used, for example, as a catalyst carrier for an internal combustion engine, a boiler, a chemical reactor, a reformer of fuel cell or the like, or as a filter for trapping particulate present in an exhaust gas; as well as to a process for producing the honeycomb structure. The present invention relates particularly to a honeycomb structure which hardly gives defects such as cracks in bonded portion, as well as to a process for producing the honeycomb structure.

BACKGROUND ART

Honeycomb structures are used, for example, as a catalyst carrier for an internal combustion engine, a boiler, a chemical reactor, a reformer of fuel cell or the like, or as a filter for particulate matter present in an exhaust gas, particularly diesel particulate matter.

In the honeycomb structure used for such a purpose, the sharp temperature change of exhaust gas and the local heating make non-uniform the temperature distribution inside the honeycomb structure, which has caused problems such as crack generation in honeycomb structure and the like.

When the honeycomb structure is used particularly as a filter for trapping a particulate matter in an exhaust gas emitted from a diesel engine (the filter is hereinafter referred to as DPF), it is necessary to burn the carbon particles trapped on the filter to remove the particles and regenerate the filter and, in that case, high temperatures are inevitably generated locally in the filter; as a result, a big thermal stress and cracks have tended to generate.

Hence, it was proposed to bond a plurality of honeycomb segments with a cement to produce a honeycomb structure.

For example, in U.S. Pat. No. 4,335,783 is disclosed a process for producing a honeycomb structure, which comprises bonding a number of honeycomb parts using a discontinuous cement.

Also in JP-B-61-51240 is proposed a heat shock-resistant rotary regenerating heat exchanging method which comprises forming, by extrusion, matrix segments of honeycomb structure made of a ceramic material; firing them; making smooth, by processing, the outer peripheral portions of the fired segments; coating the to-be-bonded areas of the resulting segments with a ceramic cement having, when fired, substantially the same mineral composition as the matrix segments and showing a difference in thermal expansion coefficient, of 0.1% or less at 800 degree C.; and firing the coated segments.

Also in a SAE article 860008 of 1986 is disclosed a ceramic honeycomb structure obtained by bonding cordierite honeycomb segments with a cordierite cement.

These honeycomb structures, however, are not sufficient in bonding strength between a honeycomb segment and a bonding layer. Further the honeycomb structures have bonding defects such as a separation or a crack at the interface between a bonding layer and a honeycomb segment caused by differences in thermal expansion coefficient, drying shrinkage, and the like between the bonding layer and the honeycomb structure.

In order to solve these problems, in JP-A-8-28246 is disclosed a ceramic honeycomb structure obtained by bonding honeycomb ceramic members with an elastic sealant made of at least a three-dimensionally intertwined inorganic fiber, an inorganic binder, an organic binder and inorganic particles. However, use of the organic binder (which is difficult to handle) makes long the drying time of sealant, makes difficult the homogenization of sealant composition and makes more the number of materials used in sealant; as a result, a lower productivity is invited.

Hence, there is desired a honeycomb structure which is small in bonding defects and has a high bonding strength, even though it contains no organic binder.

DISCLOSURE OF THE INVENTION

The present invention has been made in view of the above situation, and aims at providing a honeycomb structure having a high bonding strength and hardly giving defects such as cracks of bonded portion, as well as a process for producing the honeycomb structure.

The present invention provides a honeycomb structure comprising a plurality of honeycomb segments bonded into one piece via a bonding layer, each segment having a number of through-holes divided from each other by porous partition walls and extending in an axial direction of the honeycomb segment, wherein the bonding layer comprises at least one cement layer and at least one undercoat layer present between the honeycomb segment and the cement layer.

In the present invention, it is preferred that the bonding layer comprises an undercoat layer formed directly on a side wall of the honeycomb segment, and it is more preferred that a part of the undercoat layer is in pores of the honeycomb segment. It is also preferred that defining a thermal expansion coefficient of the undercoat layer as "Ut", a thermal expansion coefficient of the honeycomb segment as "Ht" and a thermal expansion coefficient of the cement layer as "At", a relationship between "Ut", "Ht" and "At" is $Ht \leq Ut \leq At$ or $Ht \geq Ut \geq At$. It is further preferred that defining a content of at least one component X constituting the cement layer as "Ax", a content of the component X in the honeycomb segment as "Hx" and a content of the component X in the undercoat layer as "Ux", a relationship between "Ax", "Hx" and "UX" is $Hx \leq Ux \leq Ax$ or $Hx \geq Ux \geq Ax$. It is preferred that the cement layer and the undercoat layer are made of a cement and an undercoat agent, respectively, and a viscosity of the undercoat agent is low relative to a viscosity of the cement.

The present invention further provides a process for producing a honeycomb structure, comprising steps of: producing honeycomb segments each having a number of through-holes divided from each other by porous partition walls and extending in the axial direction of the honeycomb segment; and bonding the honeycomb segments to produce a honeycomb structure, wherein the step of bonding the honeycomb segments comprises: applying at least one layer of an undercoat agent on the honeycomb segment; applying at least one layer of a cement; and bonding the honeycomb segments into one piece.

In the present invention it is preferred that a viscosity of the undercoat agent is low relative to a viscosity of the cement. It is also preferred that both the undercoat agent and the cement contain a solid component and a liquid component, defining a content of at least one component Y constituting the solid component of the cement as "Ay", a content of the component Y in the honeycomb segment as "Hy" and a content of the component Y in the solid component of the undercoat agent as "Uy", a relationship between "Ay", "Hy" and "Uy" is Hy≦Uy≦Ay or Hy≧Uy≧Ay.

The present invention further provides a process for producing a honeycomb structure, comprising a step of bonding honeycomb segments to produce a honeycomb structure, each honeycomb segment having a number of through-holes divided from each other by porous partition walls and extending in the axial direction of the honeycomb segment, wherein the step of bonding the honeycomb segments comprises: applying at least one layer of an undercoat agent on each honeycomb segment; applying at least one layer of a cement; and bonding the honeycomb segments into one piece.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1(a) is a schematic perspective view of a honeycomb segment; FIG. 1(b) is a schematic perspective view of a honeycomb structure; and FIG. 1(c) is a schematic plan view of the honeycomb structure.

BEST MODE FOR CARRYING OUT THE INVENTION

The present honeycomb structure and the present process for production thereof are described in detail below with reference to the accompanying drawings. However, the present invention is not restricted to the following embodiments. Incidentally, in the following, the expression "section" means a section perpendicular to the lengthwise direction (X-axis direction) of through-holes, unless otherwise specified.

Figure 1A:
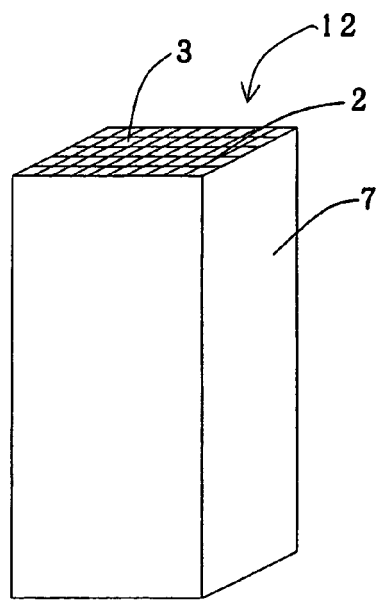
FIGS. 1(a) to 1(c) are schematic views showing an embodiment of the honeycomb structure according to the present invention.
Figure 1B:
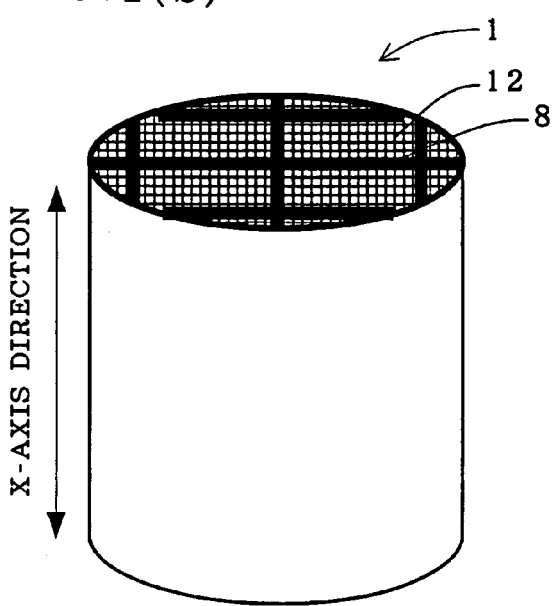
Figure 1C:
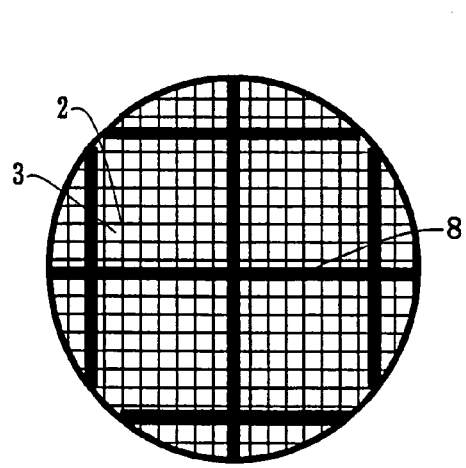

The honeycomb structure 1 of the present invention, as shown in, for example, FIGS. 1(a) to 1(c), is constituted by bonding a plurality of honeycomb segments 12 having honeycomb configuration each having a number of through-holes 3 divided from each other by porous partition walls 2 and extending in the axial direction of the honeycomb segment 12, into one piece via a bonding layer 8.

Figure 2:
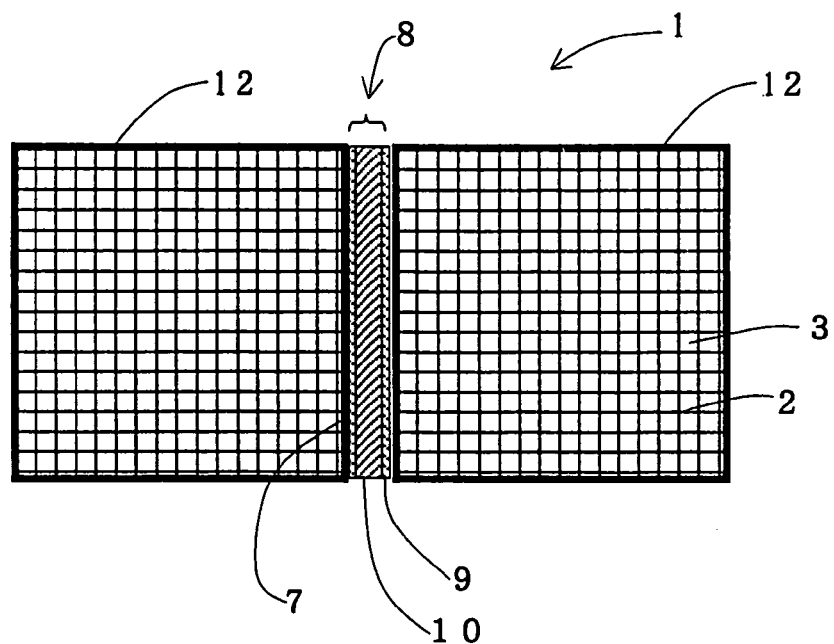
FIG. 2 is a schematic plan view showing another embodiment of the honeycomb structure according to the present invention.

An important characteristic of the present invention is that the bonding layer 8 comprises at least one cement layer 10 and at least one undercoat layer 9 present between the honeycomb segment 12 and the cement layer 10, as shown in, for example, FIG. 2. By using such a constitution, the undercoat layer can strongly bond the honeycomb segment with the cement layer. The bond between adjacent honeycomb segments becomes strong, and stress generation at the interface between the honeycomb segment 12 and the bonding layer 8 can be hindered.

In such a constitution, it is preferred that the undercoat layer 9 is formed directly on the side wall 7 of the honeycomb segment and it is more preferred that the undercoat layer 9 is formed on both side walls 7 of two honeycomb segments to be bonded with each other. Here, since the side wall 7 of the honeycomb segment is porous, it is preferred to hold a part of the undercoat layer extending into pores of the side wall 7 because the bond between the honeycomb segment and the undercoat layer becomes stronger owing to a so-called anchor effect.

Figure 3:
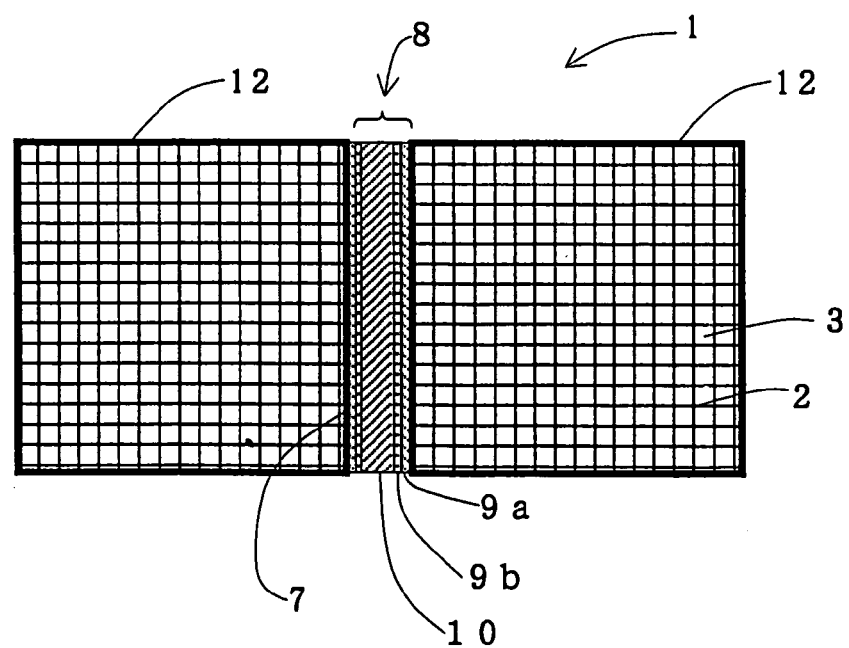
FIG. 3 is a schematic plan view showing still another embodiment of the honeycomb structure according to the present invention.

It is also preferred that in the honeycomb structure of the present invention, at least two undercoat layers 9a and 9b are present between the honeycomb segment 12 and the cement layer 10, as shown in FIG. 3. In this case, it is preferred to hold a part of the undercoat layer 9a formed directly on the honeycomb segment extending into pores of the honeycomb segment.

In order to obtain a constitution in which a part of the undercoat layer are in pores of the side wall 7 of the honeycomb segment, it is preferred to, for example, allow an undercoat (which is a raw material for the undercoat layer) to have a low viscosity. With this low viscosity, the solid component of the undercoat (which becomes the undercoat layer) penetrates easily into pores of the side wall 7. In general, because the bonding layer needs to have a certain thickness and easy handling, a cement used for formation of the bonding layer has a relatively high viscosity. Therefore, by, as mentioned above, employing the constitution in which the undercoat layer 9 is present between the honeycomb segment 12 and the cement layer 10, applying an undercoat of low viscosity in a thin layer, and applying thereon a cement of high viscosity, there can be simultaneously achieved a bonding layer of sufficient thickness and an improved adhesive strength owing to the anchor effect of the undercoat layer. Specifically, the viscosity of the cement is preferably 150 to 800 P (poises), more preferably 200 to 600 P, most preferably 250 to 500 P. The viscosity of the undercoat is preferably 0.01 to 150 P, more preferably 0.02 to 50 P, most preferably 0.05 to 10 P. When a plurality of undercoat layers 9a and 9b are present between the honeycomb segment 12 and the cement layer 10, as shown in FIG. 3, it is preferred that the viscosity of the undercoat forming the undercoat layer 9a directly on the side wall 7 is lower than the viscosity of the cement forming the cement layer 10; and it is more preferred that the viscosity of the undercoat forming the undercoat layer 9a, the viscosity of the undercoat forming the undercoat layer 9b and the viscosity of the cement forming the cement layer 10 become higher in this order.

When the thermal expansion coefficient of the undercoat layer is expressed as Ut, the thermal expansion coefficient of the honeycomb segment is expressed as Ht, and the thermal expansion coefficient of the cement layer is expressed as At, it is preferred that there is a relation of Ht≦Ut≦At or Ht≧Ut≧At and it is more preferred that there is a relation of Ht≧Ut≧At. Particularly when there is a relation of Ht<Ut<At or Ht>Ut>At, preferably a relation of Ht>Ut>At, the undercoat layer 9 functions so as to buffer the difference in thermal expansion coefficient between the honeycomb segment 12 and the cement layer 10 and can hinder generation of a thermal stress at the interface between the bonding layer and the honeycomb segment. When a plurality of the undercoat layers 9a and 9b are present between the honeycomb segment 12 and the cement layer 10, as shown in FIG. 3 and when their thermal expansion coefficients are expressed as "Uat" and "Ubt", respectively, it is preferred that either of Uat and Ubt is in a range of Ht to At and it is more preferred that there is a relation of Ht≦Uat≦Ubt≦At or Ht≧Uat≧Ubt≧At.

Preferably, the undercoat layer 9 and the cement layer 10 are composed mainly of a ceramic and are formed by subjecting, to drying, heating, firing raw materials containing at least one kind of colloidal sol (e.g. silica sol or alumina sol), at least one kind of inorganic powder such as ceramic (selected from the group consisting of silicon carbide, silicon nitride, cordierite, alumina, mullite, zirconia, zirconium phosphate, aluminum titanate, titania and combinations thereof), a Fe—Cr—Al type metal, a nickel-based metal, metal Si and SiC, or the like, at least one kind of inorganic fiber such as ceramic fiber (e.g. silica, mullite, alumina or silica-alumina) or the like, an inorganic binder, and so forth. The raw materials may further contain an organic binder (e.g. methylcellulose, ethylcellulose, polyvinyl alcohol, or hydroxypropoxyl methylcellulose), etc. The colloidal sol is suitable for giving bonding strength. The inorganic powder is suitable for improving affinity with honeycomb segment and is preferably the same inorganic powder as used in the honeycomb segment as its main component. The inorganic fiber is suitable as a reinforcing material for imparting toughness to the bonding layer.

In the present invention, the component constituting the undercoat layer and the cement layer is individual component formed from the raw material component different in chemical composition, crystal structure or form, such as inorganic powder, inorganic fiber, colloidal sol or the like, present in the undercoat and cement (which are raw material). When, for example, the cement layer contains components formed from at least two kinds of inorganic powders, at least one kind thereof means the inorganic powder component of the cement layer. When this component is expressed, for example, as X, it is preferred that the relation of the content Ax of the component X in cement layer, the content Hx of the component X in honeycomb segment, and the content Ux of the component X in undercoat layer is $Hx \leq Ux \leq Ax$ or $Hx \geq Ux \geq Ax$.

By employing such a constitution, properties (e.g. thermal expansion coefficients and thermal conductivity) of the undercoat layer and the cement layer can be varied. In particular, a relation of $Hx<Ux<Ax$ or $Hx>Ux>Ax$ is preferred because the properties (e.g. thermal expansion coefficients and thermal conductivity) between each member (the honeycomb segment, the undercoat layer and the cement layer) change gradually and stress concentration and generation of cracks at the interfaces can be hindered. Here, the content of a certain component in honeycomb segment, undercoat layer or cement layer is a value expressed as mass % relative to the mass of the whole member. By changing the contents of the raw materials of the undercoat layer and/or the cement layer, i.e. the components constituting the undercoat and/or the cement, the contents of the components constituting the undercoat layer and the cement layer can be changed, whereby the above-mentioned constitution can be achieved.

Specifically, for example, when the honeycomb segment is made of metal Si and silicon carbide, and when the inorganic powders of the undercoat layer and the cement layer are an inorganic fiber and silicon carbide, the presence of other component such as metal Si or the like allows the honeycomb segment to have a larger thermal expansion coefficient because the thermal expansion coefficients of the inorganic fiber and silicon carbide are small. Meanwhile, the bonding layer is preferred to contain a component such as colloidal sol, inorganic fiber or the like for good bonding strength and toughness. In this case, for example, when the content of the inorganic fiber F of the undercoat layer is expressed as Uf, the content of the inorganic fiber F of the cement layer is expressed as Af, and the content of the inorganic fiber F of the honeycomb segment is expressed as Hf and when the honeycomb segment contains no inorganic fiber F, the contents of the inorganic fiber F of the three members become $Af>Uf>Hf=0$ by making Uf smaller than Af. The thermal expansion coefficients of the three members can be allowed to be $At<Ut<Ht$, and it is possible to disperse the thermal stress at the interfaces between the members and hinders generation of a large stress.

When, as shown in FIG. 3, there are a plurality of undercoat layers 9a and 9b between the honeycomb segment 12 and the cement layer 10 and when the contents of the component X in 9a and 9b are expressed as Uax and Ubx, respectively, either of Uax and Ubx may be in a range of Hx to Ax but it is preferred that there is a relation of $Hx \leq Uax \leq Ubx \leq Ax$ or $Hx \geq Uax \geq Ubx \geq Ax$.

In the present invention, there is no particular restriction as to the thickness of the cement layer 10. However, too large a thickness results in too large a pressure loss when an exhaust gas passes through the resulting honeycomb structure; too small a thickness, the cement may not exhibit its inherent adhesivity; therefore, such thickness is not preferred. A preferred thickness of the cement layer 10 is 0.1 to 3.0 mm. There is no particular restriction as to the thickness of the undercoat layer 9. However, too large a thickness tends to generate cracks; too small a thickness is unable to obtain a so-called anchor effect; therefore, such thickness is not preferred. A preferred thickness of the undercoat layer 9 is 10 to 500 μm.

In the present invention, the main component of the honeycomb segment 12 is preferred to comprise at least one kind of ceramic selected from the group consisting of silicon carbide, silicon nitride, cordierite, alumina, mullite, zirconia, zirconium phosphate, aluminum titanate, titania, and combinations thereof, a Fe—Cr—Al type metal, a nickel-based metal, or metallic Si and Sic, from the standpoints of the strength, heat resistance, etc. of the honeycomb segment. Here, the expression "main component" means a component constituting 80% by mass or more of the total components and becoming a main crystal phase.

In the present invention, when the honeycomb segment 12 is made of metallic Si and SiC, the Si content specified by Si/(Si+SiC) is preferably 5 to 50% by mass, more preferably 10 to 40% by mass. The reason is that when the Si content is less than 5% by mass, there is substantially no effect of Si addition and, when the Si content is more than 50% by mass, it is difficult to obtain heat resistance and high thermal conductivity which are characteristics of SiC. In this case, it is preferred that the cement 9 as well contains either or both of metallic Si and SiC.

In the present invention, there is no particular restriction as to the cell density (the number of through-holes 3 per unit sectional area) of the honeycomb segment 12. However, too small a cell density results in an insufficient geometrical surface area; too large a cell density results in too large a pressure loss; therefore, such cell densities are not preferred. The cell density is preferably 0.9 to 310 cells/cm$^2$ (6 to 2,000 cells/in.$^2$). There is no particular restriction as to the sectional shape (cell shape) of each through-hole 3. It can be various shapes such as polygon (e.g. triangle, tetragon or hexagon), circle, ellipse, corrugation and the like; however, it is preferred to be any of a triangle, a tetragon and a hexagon for easiness of production. There is no particular restriction as to the thickness of each partition wall 2. However, too small a thickness results in an insufficient honeycomb segment strength; too large a thickness results in too large a pressure loss; therefore, such thickness is not preferred. The thickness of each partition wall 2 is preferred to be 50 to 2,000 µm.

There is no particular restriction as to the shape of each honeycomb segment 12, and the shape can be various. However, it is preferred that the honeycomb segment 12 has, for example, a basic tetragonal prism shape such as shown in FIG. 3 and these basic shapes are bonded into one piece as shown in FIGS. 1(a) and 1(b) so that the shapes of the outermost honeycomb segments of a honeycomb structure 1 to be produced are matched to the peripheral shape of the honeycomb structure 1. It is also possible to allow each honeycomb segment 12 to have a fan-shaped section.

There is no particular restriction as to the sectional shape of the present honeycomb structure 1, and the sectional shape can be various shapes such as circle shown in FIGS. 1(a) and 1(b), ellipse, polygon (e.g. triangle, tetragon shown in FIG. 2 or pentagon), irregular shape and the like. When the honeycomb structure of the present invention is used as a catalyst carrier in an internal combustion engine, a boiler, a chemical reactor, a reformer of fuel cell or the like, it is preferred to load, on the honeycomb structure, a metal having a catalytic activity. As representative metals having a catalytic activity, there can be mentioned Pt, Pd, Rh, etc. At least one kind of such metal is preferred to be loaded on the honeycomb structure.

Meanwhile, when the honeycomb structure of the present invention is used as a filter (e.g. a DPF) for trapping and removing a particulate matter present in an exhaust gas, it is preferred that the openings of the through-holes of the honeycomb structure 3 are plugged alternately. When the openings of the through-holes 3 are plugged alternately and when a particulate matter-containing exhaust gas is introduced into the honeycomb structure at its one end face, the exhaust gas enters the inside of the honeycomb structure 1 from those through-holes 3 not plugged at the one end face of honeycomb structure, passes through porous partition walls 2 having a filtration ability, and is discharged from those through-holes 3 not plugged at the other end face. When the exhaust gas passes through the partition walls, the particulate matter present in the exhaust gas is trapped by the partition walls. As the trapped particulate matter deposits on the partition walls, there occurs a sudden increase in pressure loss, the engine emitting the exhaust gas receives a higher load, and there appear reductions in fuel consumption and drivability. Therefore, heating by a heater or the like is periodically conducted to burn and remove the particulate matter and regenerate the filter. In order to promote combustion during the burning and regeneration, the honeycomb structure may be loaded with the above-mentioned metal having a catalytic activity.

Next, description is made on the process for producing the honeycomb structure of the present invention.

In the process for producing the honeycomb structure of the present invention, first, honeycomb segments 12 are produced. There is no particular restriction as to the step for producing the honeycomb segments 12 and there can be used a method generally used in production of a member having a honeycomb configuration. For example, honeycomb segments can be produced by the following step.

As a raw material, there is used, for example, at least one kind of ceramic selected from the group consisting of silicon carbide, silicon nitride, cordierite, alumina, mullite, zirconia, zirconium phosphate, aluminum titanate, titania and combinations thereof, a Fe—Cr—Al type metal, a nickel-based metal, or metallic Si and Sic. Thereto are added a binder such as methylcellulose, hydroxypropoxyl methylcellulose or the like, a surfactant, water, etc. to produce clay having plasticity.

The clay is subjected to, for example, extrusion to form a molded honeycomb body having a number of through-holes 3 divided from each other by partition walls 2 and extending in the axial direction of the honeycomb body.

The honeycomb body is dried using, for example, a microwave and hot air and then fired, whereby a honeycomb segment 12 such as shown in FIG. 3 can be produced. The honeycomb segment 12 produced can be allowed to have a desired shape mentioned in the above description of the present honeycomb structure.

In the present invention, after production of the honeycomb segments 12, a plurality of such honeycomb segments are bonded into a honeycomb structure. Incidentally, by, for example, purchasing produced honeycomb segments and using the following step, a honeycomb structure may be produced.

This step comprises applying an undercoat to at least one side, preferably both of the to-be-bonded sides 7 of two honeycomb segments 12 such as shown in FIG. 2, applying a cement in at least one layer, and bonding the two honeycomb segments into one piece.

The undercoat preferably contains a solid component and a liquid component and is preferably a slurry. The solid component of the cement means a component which remains in the cement layer finally formed with the cement. The solid component does not contain components which are removed by vaporization, etc. during the formation of cement layer, but contains even those components which make chemical or physical change during the above stage but are not removed. The solid component of the undercoat is preferably prepared by subjecting, to drying, heating, firing, etc., a raw material containing at least one kind of colloidal sol (preferably a silica sol, an alumina sol or the like), at least one kind of inorganic powder selected from a ceramic (selected from the group consisting of silicon carbide, silicon nitride, cordierite, alumina, mullite, zirconia, zirconium phosphate, aluminum titanate, titania and combinations thereof), a Fe—Cr—Al type metal, a nickel-based metal, metal Si and SiC, etc., at least one kind of inorganic fiber (e.g. a ceramic fiber selected form silica, mullite, alumina, silica-alumina, etc.), and an inorganic binder, etc. The raw material may further contain, for example, an organic binder such as methylcellulose, ethylcellulose, polyvinyl alcohol, hydroxypropoxyl methylcellulose or the like. There is no particular restriction as to the method for applying the cement. It can be applied by, for example, spraying, coating by brush, writing brush or the like, or dipping. Two or more kinds of undercoats may be applied in two or more times so that two or more undercoat layers (e.g. the undercoat layers 9a and 9b shown in FIG. 3) are formed on the side wall of the honeycomb segment.

Preferably, the cement as well contains a solid component and a liquid component and is a slurry. The solid component of the cement preferably contains those selected from the above-mentioned examples of the preferable solid components of the undercoat. There is no particular restriction as to the method for applying the cement, and the cement can be applied in the same method as for the undercoat.

It is preferred that the cement is applied on the undercoat applied. In this case, the cement may be applied after the undercoat has been applied and then subjected to drying, heating, firing, etc., or may be applied after the application of the undercoat but without conducting drying, heating, firing or the like. When the undercoat is applied only on one side wall 7 of two honeycomb segments to be bonded, the cement may be applied directly on the other side wall 7 and, in this case, there is no rule as to the order of application of the undercoat and the cement.

In this step, the viscosity of the undercoat is preferably lower than the viscosity of the cement. The reason is that, as described above, with the lower viscosity of the undercoat, the components of the undercoat penetrate into pores of each honeycomb segment and the finally produced honeycomb structure has an increased bonding strength. Specifically, the viscosity of the cement is preferably 150 to 800 P (poises), more preferably 200 to 600 P, most preferably 250 to 500 P. The viscosity of the undercoat is preferably 0.01 to 150 P, more preferably 0.02 to 50 P, most preferably 0.05 to 10 P. When the undercoat is applied so as to form at least two undercoat layers on one side wall as shown in FIG. 3, it preferred that the viscosity of the undercoat for the undercoat layer 9a formed directly on the side wall 7 is lower than the viscosity of the cement for the cement layer 10; and, it is more preferred that the viscosity of the undercoat for the undercoat layer 9a is smallest, a gradual viscosity increase is made, and the viscosity of the cement for the cement layer 10 present in the center of bonding layer is largest.

It is also preferred that there is a relation of $Hy \leq Uy \leq Ay$ or $Hy \geq Uy \geq Ay$ when Uy is the content of a certain component Y constituting the solid component of the undercoat, Ay is the content of the component Y in the cement, and Hy is the content of the component Y in the honeycomb segment. Here, each of the contents Uy and Ay means a content relative to the total solid components. By employing such a constitution, the properties (e.g. thermal expansion coefficients and thermal conductivity) of the finally formed honeycomb segment, undercoat layer and cement layer change gradually in this order and there can be hindered stress concentration and generation of cracks at the interface between the segment and the bonding layer. When the undercoat is applied so as to form at least two undercoat layers on one side wall as shown in FIG. 3 and when the content of the component Y constituting the solid components of the undercoat for the undercoat layer 9a directly formed on the side wall 7 is expressed as Uay and the content of the component Y constituting the solid components of the undercoat for 9b is expressed as Uby, it is preferred that either of Uay and Uby is in a range of Hy to Ay and it is more preferred that there is a relation of $Hy \leq Uay \leq Uby \leq Ay$ or $Hy \geq Uay \geq Uby \geq Ay$.

Next, the individual honeycomb segments are bonded into one piece to produce a honeycomb structure 1. Then, it is dried and/or fired depending upon the cement used, to obtain a high bonding strength.

When the honeycomb structure 1 produced according to the present invention is used as a filter, particularly as a DPF or the like, it is preferred that the openings of the through-holes 3 are plugged alternately with a sealant, and it is further preferred that each end face of the structure is plugged so as to have a checkered pattern. The plugging with a sealant can be conducted by masking those through-holes not to be plugged, applying a raw material of sealant in a slurry state to each end face of the honeycomb segment, and conducting drying and firing. It is preferred to conduct the plugging in the above-mentioned step of honeycomb segment production, that is, after forming the honeycomb segment but before the firing, because the firing can be completed in one time. However, the plugging may be conducted after the firing, or may be conducted at any timing after forming the honeycomb segment. The raw material of the sealant used can be selected appropriately from the above-mentioned preferred raw materials for the honeycomb segment. The raw material is preferably the same raw material used for the honeycomb segment.

In the present invention, the honeycomb structure may be loaded with a catalyst. The method for loading a catalyst can be one ordinarily used by those skilled in the art, and the catalyst loading can be done, for example, by wash-coating a catalyst slurry and conducting drying and firing. This step may be conducted at any timing after forming the honeycomb segment.

The present invention is described more specifically below by way of Examples. However, the present invention is in no way restricted to these Examples.

(Production of Honeycomb Segment)

There were used, as a raw material, 80 parts by weight of a silicon carbide powder and 20 parts by weight of a metal silicon powder. Thereto were added methylcellulose, hydroxypropoxyl methylcellulose, a surfactant and water to produce clay having plasticity. The clay was subjected to extrusion and dried with a microwave and hot air. Then, the resulting body was heated for degreasing in the air and fired to obtain a tetragonal prism-shaped honeycomb segment having dimensions of 58 mm×58 mm×150 mm (height) such as shown in FIG. 1(a).

(Preparation of Undercoats and Cement)

Components shown in Table 1 were mixed at proportions shown in Table 1 to prepare a cement and undercoats 1 and 2. They were measured for viscosity using a viscotester. The viscosity and contents of solid components, of the cement and the undercoats 1 and 2 are shown in Table 1.

TABLE 1

| | Composition | Cement (parts by mass) | Undercoat 1 (parts by mass) | Undercoat 2 (parts by mass) | Honeycomb segment |
|---|---|---|---|---|---|
| | SiC | 65 | 65 | 65 | |
| | Silica sol | 34 | 34 | 34 | |
| | Ceramic fiber | 45 | 20 | 0 | |
| | Inorganic auxiliary agent | 1 | 1 | 1 | |
| | Water | 15 | 70 | 65 | |
| | Viscosity (poises) | 300 | 0.2 | 0.07 | |
| Contents of solid components | SiC | 0.52 | 0.65 | 0.82 | 0.80 |
| | Silica sol | 0.11 | 0.14 | 0.17 | 0.00 |
| | Ceramic fiber | 0.36 | 0.20 | 0.00 | 0.00 |
| | Inorganic auxiliary agent | 0.01 | 0.01 | 0.01 | 0.00 |

(Measurement of Thermal Expansion Coefficients)

Part of each of the cement and undercoats 1 and 2 obtained was heated and dried at about 200 degree C. for solidification, and the resulting solids were measured for thermal expansion coefficient from 25 to 800 degree C. Also, the honeycomb segment obtained was measured for thermal expansion coefficient in the same manner. The results are shown in Table 2.

TABLE 2

| Components | Cement layer | Undercoat layer 1 | Undercoat layer 2 | Honeycomb segment |
|---|---|---|---|---|
| SiC | 0.52 | 0.65 | 0.82 | 0.80 |
| Substance derived from silica sol | 0.11 | 0.14 | 0.17 | 0.00 |
| Ceramic fiber | 0.36 | 0.20 | 0.00 | 0.00 |
| Inorganic auxiliary agent | 0.01 | 0.01 | 0.01 | 0.00 |
| Thermal expansion coefficient (/° C.) | $3 \times 10^{-6}$ | $3.3 \times 10^{-6}$ | $3.6 \times 10^{-6}$ | $4.2 \times 10^{-6}$ |

(Observation by Electron Microscope)

Figure 4:
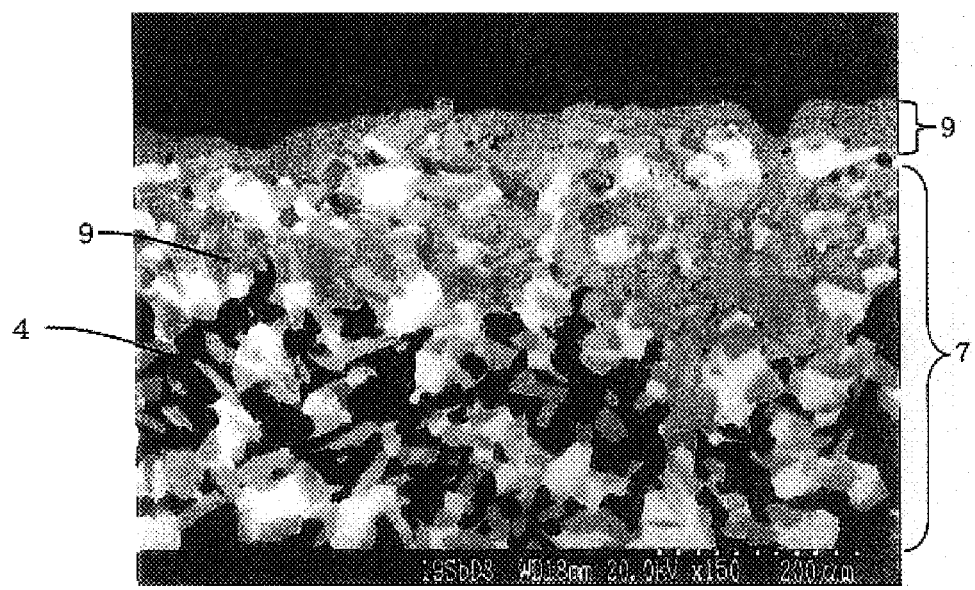
FIG. 4 is an electron micrograph showing a state in which an undercoat layer extends into pores of a honeycomb segment.

The undercoat 2 obtained above was applied on the honeycomb segment obtained above, the resulting segment was heated and dried at 200 degree C., and the section of the segment was observed by scanning electron microscope (SEM). The photograph obtained is shown in FIG. 4. It is clear from FIG. 4 that the undercoat layer 9 made from the undercoat 2 extends into inside pores 4 of the honeycomb segment.

EXAMPLE 1

Two honeycomb segments obtained above were coated at their side walls 7 with the undercoat 1. Then, the cement was coated on the undercoat 1 on either one of the two honeycomb segments. Then, the two honeycomb segments were bonded into one piece, after which heating and drying at about 200 degree C. was conducted to obtain a honeycomb structure.

EXAMPLE 2

A honeycomb structure was obtained in the same manner as in Example 1 except that first the undercoat 2 was coated and then the undercoat 1 was coated on the undercoat 2 on each honeycomb segment.

COMPARATIVE EXAMPLE 1

A honeycomb segment was obtained in the same manner as in Example 1 except that the undercoat 1 was not coated.

Each honeycomb structure obtained was observed for separation at the bonded portion. Each honeycomb structure was also measured for bonding strength at the bonded portion by a four-point bending test. The portion separated at the interface between the bonding layer and the honeycomb segment was taken as no bonding; the portion separated by breakage of bonding layer (the interface being not separated) was taken as bonded area; and the ratio of the bonded area to the total bonding area was taken as bonded area ratio. Respective results are shown in Table 3.

TABLE 3

| | Comparative Example 1 | Example 1 | Example 2 |
|---|---|---|---|
| Constitution of bonding layer | Cement layer only | Undercoat layer 1 Cement layer Undercoat layer 1 | Undercoat layer 2 Undercoat layer 1 Cement layer Undercoat layer 1 Undercoat layer 2 |
| Bonding strength (MPa) | 0.2 | 1 | 2 |
| Bonded area ratio | 20% | 60% | 95% |
| separation of bonded portion | Yes | No | No |

In the honeycomb structure obtained in Example 1, there is a relation of Ht>Ut>At with respect to the thermal expansion coefficient and a relation of Hx>Ux>Ax when SiC is expressed as component X. Also, when the ceramic fiber used is expressed as component X, there is a relation of Hx<Ux<Ax. In the honeycomb structure obtained in Example 2, there are a relation of Ht>Ut2>Ut1>At when the thermal expansion coefficients of the undercoat layer 1 and the undercoat layer 2 are expressed as Ut1 and Ut2, respectively and a relation of Hx=Ux2<Ux1<At when the contents of the component X in the undercoat layer 1 and the undercoat layer 2 are expressed as Ux1 and Ux2, respectively and the ceramic fiber is expressed as the component X.

As is clear from Table 3, the honeycomb structures obtained in Examples 1 and 2 showed no separation in each bonded portion and, as compared with the honeycomb structure obtained in Comparative Example 1, each showed a high bonding strength and a high bonded area ratio.

INDUSTRIAL APPLICABILITY

As described above, the honeycomb structure of the present invention has at least one undercoat layer and at least one cement layer between the honeycomb segments. Therefore, it has a high bonding strength and hardly generates defects such as cracks in bonded portion. Accordingly, the present honeycomb structure can be suitably used, for example, as a carrier for the catalyst used in an internal combustion engine, a boiler, a chemical reactor, a reformer of fuel cell or the like, or as a filter for trapping fine particles present in an exhaust gas. Also, according to the present production process, there can be easily produced a honeycomb structure having the above-mentioned meritorious effects. Accordingly, the present production process can preferably produce a honeycomb filter such as mentioned above.

The invention claimed is:

1. A honeycomb structure comprising a plurality of honeycomb segments bonded into one piece via a bonding layer, each segment having a number of through-holes divided from each other by porous partition walls and extending in an axial direction of the honeycomb segment, wherein the bonding layer comprises at least one cement layer and at least one undercoat layer present between the honeycomb segment and the cement layer, the at least one cement layer not in direct contact with the honeycomb segment, the at least one cement layer having a viscosity higher than that of the at least one undercoat layer.

2. A honeycomb structure according to claim 1, wherein the bonding layer comprises an undercoat layer formed directly on a side wall of the honeycomb segment.

3. A honeycomb structure according to claim 2, wherein a part of the undercoat layer is in pores of the honeycomb segment.

4. A honeycomb structure according to claim 1, wherein defining a thermal expansion coefficient of the undercoat layer as "Ut", a thermal expansion coefficient of the honeycomb segment as "Ht" and a thermal expansion coefficient of the cement layer as "At", a relationship between "Ut", "Ht" and "At" is $Ht \geq Ut \geq At$ or $Ht \leq Ut \leq At$.

5. A honeycomb structure according to claim 1, wherein defining a content of at least one component X constituting the cement layer as "Ax", a content of the component X in the honeycomb segment as "Hx" and a content of the component X in the undercoat layer as "Ux", a relationship between "Ax", "Hx" and "UX" is $Hx \leq Ux \leq Ax$ or $Hx \geq Ux \geq Ax$.

6. A honeycomb structure according to claim 1, wherein the cement layer and the undercoat layer are made of a cement and an undercoat agent, respectively, and a viscosity of the undercoat agent is low relative to a viscosity of the cement.

7. A process for producing a honeycomb structure, comprising steps of:
producing honeycomb segments each having a number of through-holes divided from each other by porous partition walls and extending in the axial direction of the honeycomb segment; and
bonding the honeycomb segments to produce a honeycomb structure,
wherein the step of bonding the honeycomb segments comprises:
applying at least one layer of an undercoat agent on the honeycomb segment;
applying at least one layer of a cement on the at least one layer of undercoat agent, the at least one layer of cement not in direct contact with the honeycomb structure, the at least once cement layer having a viscosity higher than that of the at least one undercoat layer, and
bonding the honeycomb segments into one piece.

8. A process for producing a honeycomb structure according to claim 7, wherein a viscosity of the undercoat agent is low relative to a viscosity of the cement.

9. A process for producing a honeycomb structure according to claim 7, wherein both the undercoat agent and the cement contain a solid component and a liquid component, defining a content of at least one component Y constituting the solid component of the cement as "Ay", a content of the component Y in the honeycomb segment as "Hy" and a content of the component Y in the solid component of the undercoat agent as "Uy", a relationship between "Ay", "Hy" and "Uy" is $Hy \leq Uy \leq Ay$ or $Hy \geq Uy \geq Ay$.

10. A process for producing a honeycomb structure, comprising a step of bonding honeycomb segments to produce a honeycomb structure, each honeycomb segment having a number of through-holes divided from each other by porous partition walls and extending in the axial direction of the honeycomb segment, wherein the step of bonding the honeycomb segments comprises: applying at least one layer of an undercoat agent on each honeycomb segment; applying at least one layer of a cement on the at least one layer of undercoat agent, the at least one layer of cement not in direct contact with the honeycomb structure, the at least one cement layer having a viscosity higher than that of the at least one undercoat layer; and
bonding the honeycomb segments into one piece.

* * * * *